United States Patent
Fu et al.

(10) Patent No.: US 11,342,843 B2
(45) Date of Patent: May 24, 2022

(54) BOOST CONVERTER AND CONTROL METHOD

(71) Applicant: Huawei Digital Power Technologies Co., Ltd., Shenzhen (CN)

(72) Inventors: Dianbo Fu, Frisco, TX (US); Heping Dai, Plano, TX (US)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/825,789

(22) Filed: Mar. 20, 2020

(65) Prior Publication Data
US 2020/0373839 A1 Nov. 26, 2020

Related U.S. Application Data

(63) Continuation of application No. PCT/US2019/033230, filed on May 21, 2019.

(51) Int. Cl.
*H02M 3/158* (2006.01)
*H02M 1/08* (2006.01)
*H02M 1/00* (2006.01)

(52) U.S. Cl.
CPC .......... *H02M 3/158* (2013.01); *H02M 1/083* (2013.01); *H02M 1/0058* (2021.05)

(58) Field of Classification Search
CPC . H02M 2003/1552; H02M 2001/4283; H02M 2001/4291; H02M 1/12; H02M 1/42; H02M 1/4225; H02M 1/4233; H02M 1/4241; H02M 1/4258; H02M 1/425; H02M 1/4208; H02J 3/16
See application file for complete search history.

(56) References Cited

U.S. PATENT DOCUMENTS

| | | | |
|---|---|---|---|
| 6,987,675 B2 * | 1/2006 | Jovanovic | H02M 7/219 363/21.01 |
| 2003/0117251 A1 * | 6/2003 | Haugs | G05F 1/32 336/182 |
| 2005/0226012 A1 | 10/2005 | Jovanovic et al. | |
| 2014/0313627 A1 | 10/2014 | Li et al. | |
| 2015/0244284 A1 * | 8/2015 | Fu | H02M 7/537 363/41 |
| 2017/0163163 A1 * | 6/2017 | Jang | H02M 3/1582 |
| 2018/0069490 A1 | 3/2018 | Fu | |

OTHER PUBLICATIONS

Ponniran et al., "Size Reduction of DC-DC Converter using Flying Capacitor Topology with Small Capacitance" IEEJ Journal of Industry Applications, vol. 3, No. 6, pp. 446-454.

* cited by examiner

*Primary Examiner* — Bryan R Perez
(74) *Attorney, Agent, or Firm* — Slater Matsil, LLP

(57) ABSTRACT

An apparatus includes comprises an auxiliary switch, a transformer and an auxiliary diode. The auxiliary switch is configured to be turned on prior to turning on a first power switch of a multi-level boost converter. The transformer has a primary winding connected between the first power switch and the auxiliary switch. The auxiliary diode is coupled between a secondary winding of the transformer and an output terminal of the multi-level boost converter. The transformer and the auxiliary switch are configured such that the first power switch is of zero voltage switching, and the auxiliary switch is of zero current switching.

19 Claims, 5 Drawing Sheets

BOOST CONVERTER AND CONTROL METHOD

CROSS REFERENCE TO RELATED APPLICATIONS

This application a continuation of Application No. PCT/US2019/033230, entitled "Boost Converter and Control Method" and filed on May 21, 2019, which application is hereby incorporated herein by reference.

TECHNICAL FIELD

The present disclosure relates to an apparatus and method for achieving zero voltage switching in a multi-level power converter, and, in particular embodiments, to an apparatus and method for achieving zero voltage switching in a three-level boost converter.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a power regulator so as to achieve a regulated output voltage at the output of the solar power conversion system. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

To achieve an optimized solar power conversion system, boost converters may be used to get the maximum power out of the solar panels of the solar power conversion system. For example, a boost converter may be coupled between the output of a solar panel and an input of a solar inverter. The boost converter is controlled such that the output of the boost converter generates a suitable voltage source for the solar inverter coupled to the boost converter.

A boost converter comprises a switching element, a blocking device, at least one energy storage element and an output filter. The switching element may be implemented as a power transistor. The blocking device may be implemented as a diode. The energy storage element may be implemented as an inductor. The output filter may be implemented as a capacitor. The diode and the power transistor are connected in series across the capacitor. The inductor is coupled between an input power source and the common node of the diode and the power transistor. The boost converter is used to provide an output voltage higher than an input voltage from the input power source by modulating the width of a pulse applied to the power transistor.

SUMMARY

These and other problems are generally solved or circumvented, and technical advantages are generally achieved, by preferred embodiments of the present disclosure which provide an apparatus and method for achieving zero voltage switching in a three-level boost converter.

In accordance with an embodiment, a power converter comprises a first soft switching network and a second soft switching network. The first soft switching network is coupled to a low-side switch of the power converter. The first soft switching network comprises a first magnetic device and a first auxiliary switch. The first soft switching network is configured such that the low-side switch is of zero voltage switching, and the first auxiliary switch is of zero current switching. The second soft switching network is coupled to a high-side switch of the power converter. The second soft switching network comprises a second magnetic device and a second auxiliary switch. The second soft switching network is configured such that the high-side switch is of zero voltage switching, and the second auxiliary switch is of zero current switching.

The power converter comprises a first diode, a second diode, the high-side switch and the low-side switch connected in series between an output terminal of the power converter and ground. The power converter further comprises a flying capacitor connected between a common node of the first diode and the second diode, and a common node of the high-side switch and the low-side switch, and an inductor connected to a common node of the second diode and the high-side switch, and an input terminal of the power converter.

The power converter further comprises a first output capacitor and a second output capacitor connected in series between the output terminal of the power converter and ground, a first voltage clamping diode between the first soft switching network, and a common node of the first output capacitor and the second output capacitor, and a second voltage clamping diode between the second soft switching network and a positive terminal of the flying capacitor.

The first soft switching network comprises a transformer, the first auxiliary switch and a first auxiliary diode. A first terminal of a primary winding of the transformer is connected to the low-side switch. A second terminal of the primary winding of the transformer is connected to the first auxiliary switch. A first terminal of a secondary winding of the transformer is connected to a common node of the first diode and the second diode. A second terminal of the secondary winding of the transformer is connected to the output terminal of the power converter through the first auxiliary diode. The first terminal of the primary winding and the second terminal of the secondary winding share a same polarity. The power converter is a three-level boost converter.

In accordance with another embodiment, an apparatus comprises an auxiliary switch, a transformer and an auxiliary diode. The auxiliary switch is configured to be turned on prior to turning on a first power switch of a multi-level boost converter. The transformer has a primary winding connected between the first power switch and the auxiliary switch. The auxiliary diode is coupled between a secondary winding of the transformer and an output terminal of the multi-level boost converter. The transformer and the auxiliary switch are configured such that the first power switch is of zero voltage switching, and the auxiliary switch is of zero current switching.

In accordance with yet another embodiment, a method comprises providing a first soft switching network coupled to a low-side switch of a multi-level boost converter, wherein the first soft switching network comprises a first magnetic device and a first auxiliary switch. The method further comprises prior to a zero voltage turn-on transition of the low-side switch, turning on the first auxiliary switch, and after the zero voltage turn-on transition of the low-side switch, turning off the first auxiliary switch.

The method further comprises providing a second soft switching network coupled to a high-side switch of the multi-level boost converter, wherein the second soft switching network comprises a second magnetic device and a second auxiliary switch, prior to a zero voltage turn-on transition of the high-side switch, turning on the second auxiliary switch, and after the zero voltage turn-on transition of the high-side switch, turning off the second auxiliary switch.

An advantage of an embodiment of the present disclosure is achieving zero voltage switching for a three-level boost converter, thereby improving the efficiency, reliability and cost of the three-level boost converter.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a zero voltage switching three-level boost converter. The present disclosure may also be applied, however, to a variety of power converters. Hereinafter, various embodiments will be explained in detail with reference to the accompanying drawings.

Figure 1:
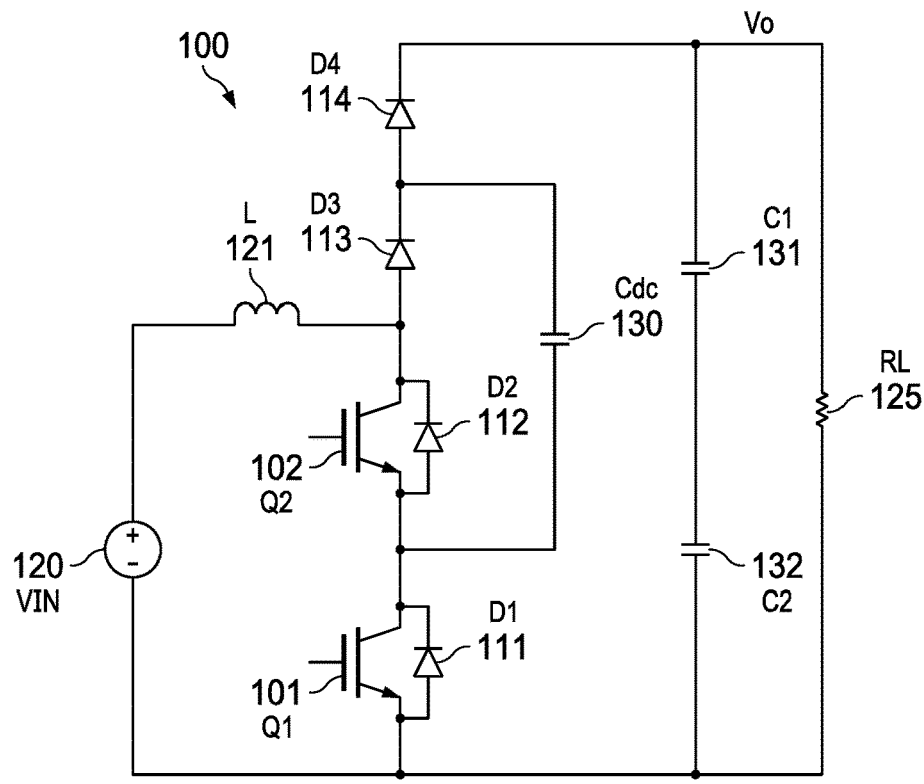
FIG. 1 illustrates a schematic diagram of a multi-level boost converter in accordance with various embodiments of the present disclosure.

FIG. 1 illustrates a schematic diagram of a multi-level boost converter in accordance with various embodiments of the present disclosure. The multi-level boost converter 100 comprises an input inductor L 121, a first switch Q1 101, a second switch Q2 102, a first blocking device, a second blocking device, a flying capacitor Cdc 130 and two output capacitors C1 131 and C2 132. As shown in FIG. 1, the multi-level boost converter 100 is coupled between an input power source VIN 120 and a load RL 125. The multi-level boost converter 100 shown in FIG. 1 is a three-level boost converter. Throughout the description, the multi-level boost converter 100 is alternatively referred to as a three-level boost converter.

In some embodiments, the first blocking device is implemented as a first diode D3 113 as shown in FIG. 1. The second blocking device is implemented as a second diode D4 114. Throughout the description, the first blocking device and the second blocking device are alternatively referred to as the first diode D3 113 and the second diode D4 114 respectively.

In comparison with a conventional boost converter, the second switch Q2 102, the first diode D3 113 and the flying capacitor Cdc 130 are employed to reduce voltage stresses on the switches and diodes. For example, the voltage rating of Q2 102 is one half of the voltage rating of Q1 101. Likewise, the voltage rating of D3 113 is one half of the voltage rating of D4 114.

As shown in FIG. 1, the second diode D4 114, the first diode D3 113, the second switch Q2 102 and the first switch Q1 101 are connected in series between the positive output terminal of the three-level boost converter 100 and ground. Throughout the description, the first switch Q1 101 may be alternatively referred to as a low-side switch. The second switch Q2 102 may be alternatively referred to as a high-side switch.

The first output capacitor C1 131 and the second output capacitor C2 132 are connected in series. The input inductor L 121 is coupled between the input power source VIN 120 and a common node of the first diode D3 113 and the second switch Q2 102. The flying Cdc 130 has a first terminal connected to a common node of diodes D3 113 and D4 114, and a second terminal connected to a common node of switches Q1 101 and Q2 102 as shown in FIG. 1.

In accordance with an embodiment, the switches (e.g., switches Q1 101 and Q2 102) may be an insulated gate bipolar transistor (IGBT) device. Alternatively, the switching element can be any controllable switches such as metal oxide semiconductor field-effect transistor (MOSFET) devices, integrated gate commutated thyristor (IGCT)

devices, gate turn-off thyristor (GTO) devices, silicon controlled rectifier (SCR) devices, junction gate field-effect transistor (JFET) devices, MOS controlled thyristor (MCT) devices, silicon carbide (SiC) devices, gallium nitride (GaN) devices and the like.

It should be noted that when switches Q1 101 and Q2 102 are implemented by MOSFET devices, the body diodes of switches Q1 101 and Q2 102 can be used to provide a freewheeling channel. On the other hand, when switches Q1 101 and Q2 102 are implemented by IGBT devices, a separate freewheeling diode (e.g., D1 111 and D2 112) is required to be connected in parallel with its corresponding switch.

As shown in FIG. 1, diodes D1 111 and D2 112 are required to provide reverse conducting paths for the three-level boost converter 100. In other words, diodes D1 111 and D2 112 are anti-parallel diodes. In some embodiments, diodes D1 111 and D2 112 are co-packaged with their respective IGBT devices. In alternative embodiments, didoes D1 111 and D2 112 are placed outside their respective IGBT devices.

The three-level boost converter 100 includes four different operating modes according to the on/off statuses of switches Q1 101 and Q2 102. In a first operating mode, switch Q1 101 is turned on and switch Q2 102 is turned off. The power from the input power source VIN 120 is used to charge the flying capacitor Cdc 130. The detailed operating principles of the first operating mode will be described below with respect to FIG. 2.

It should be noted that, in the first operating mode, the current flowing through the input inductor L may ramp up or down depending on different combinations of the input voltage, the voltage across the flying capacitor and the output voltage.

In a second operating mode, switch Q2 102 is turned on and switch Q1 101 is turned off. The energy stored in the flying capacitor Cdc 130 is discharged to the output capacitors C1 131 and C2 132. It should be noted that, in the second operating mode, the current flowing through the input inductor L 121 may ramp up or down depending on different combinations of the input voltage, the voltage across the flying capacitor and the output voltage.

In a third operating mode, both switches Q1 101 and Q2 102 are turned off. The energy stored in the input inductor L 121 is used to charge the output capacitors C1 131 and C2 132. The detailed operating principles of the third operating mode will be described below with respect to FIG. 4.

In a fourth operating mode, both switches Q1 101 and Q2 102 are turned on. The current flowing through the input inductor L 121 ramps up and energy is stored in the input inductor L 121 accordingly. The detailed operating principles of the fourth operating mode will be described below with respect to FIG. 5.

Figure 2:
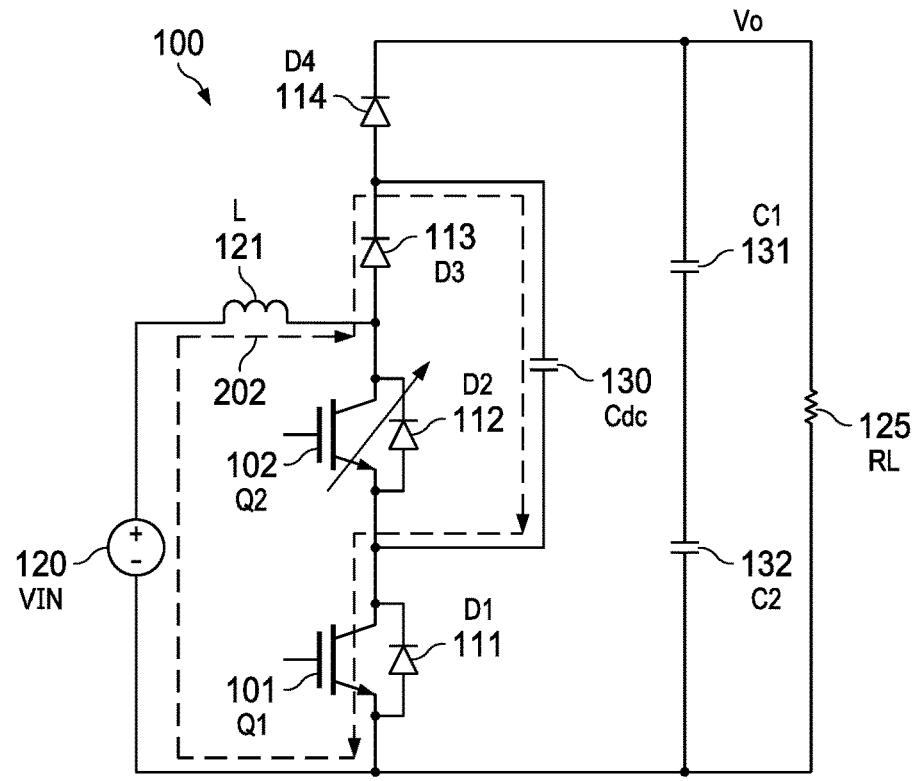
FIG. 2 illustrates a current flow of the three-level boost converter in the first operating mode in accordance with various embodiments of the present disclosure.

FIG. 2 illustrates a current flow of the three-level boost converter in the first operating mode in accordance with various embodiments of the present disclosure. During the first operating mode, switch Q2 102 is turned off as indicated by the arrow placed on top of the symbol of Q2 102. Since switch Q1 101 is turned on, a conductive path is established as indicated by the dashed line 202 shown in FIG. 2. The conductive path is formed by L 121, D3 113, Cdc 130 and Q1 101. The current flows from the positive terminal of the input power source VIN 120 to the negative terminal of the input power source VIN 120 through the conductive path shown in FIG. 2.

During the first operating mode, the flying capacitor Cdc 130 is charged and energy is stored in the flying capacitor Cdc 130 accordingly. The current flowing through the inductor L 121 may ramp up or down depending on the voltage applied across the inductor L 121. More particularly, when VIN 120 is greater than the voltage across Cdc 130, the current flowing through the inductor L 121 ramps up and the energy stored in the inductor L 121 increases accordingly. When the voltage across Cdc 130 is greater than VIN 120, the current flowing through the inductor L 121 ramps down and the energy stored in the inductor L 121 decreases accordingly.

Figure 3:
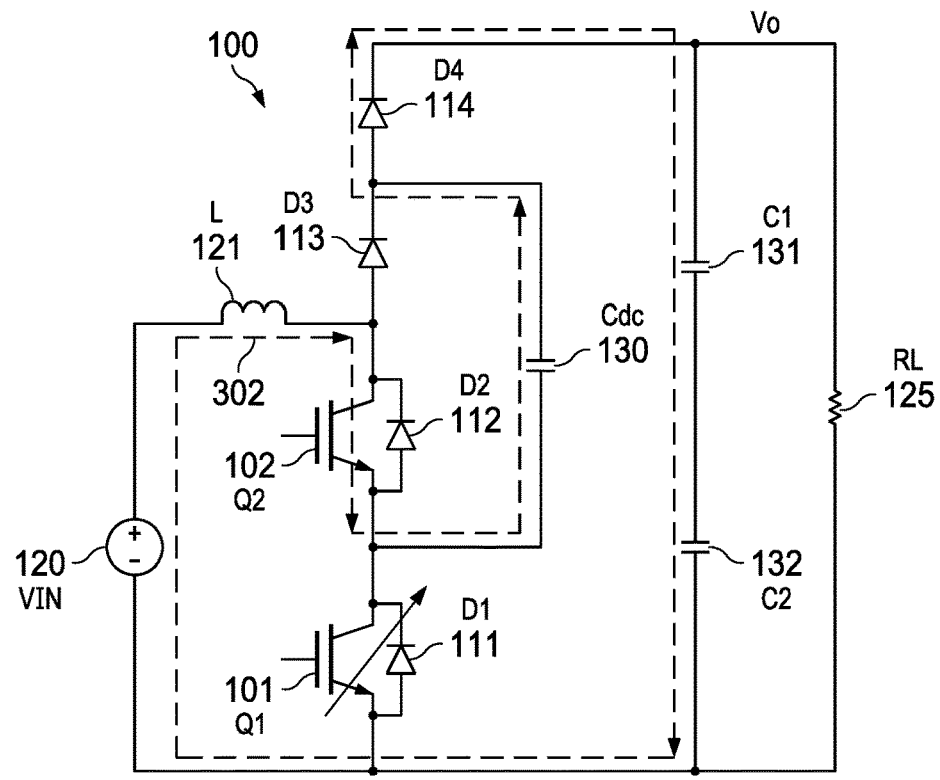
FIG. 3 illustrates a current flow of the three-level boost converter 100 in the second operating mode in accordance with various embodiments of the present disclosure.

FIG. 3 illustrates a current flow of the three-level boost converter 100 in the second operating mode in accordance with various embodiments of the present disclosure. During the second operating mode, switch Q1 101 is turned off as indicated by the arrow placed on top of the symbol of Q1 101. Since switch Q2 102 is turned on, a conductive path is established as indicated by the dashed line 302 shown in FIG. 3. The conductive path is formed by inductor L 121, Q2 102, Cdc 130, D4 114 and C1 131/C2 132. The current flows from the positive terminal of the input power source VIN 120 to the negative terminal of the input power source VIN 120 through the conductive path shown in FIG. 3.

During the second operating mode, the flying capacitor Cdc 130 is discharged to the load RL 125 and the output capacitors C1 131/C2 132. The current flowing through the inductor L 121 may ramp up or down depending on the voltage applied across the inductor L 121. More particularly, when the sum of VIN 120 and the voltage across Cdc 130 is greater than the output voltage Vo, the current flowing through the inductor L 121 ramps up and the energy stored in the inductor L 121 increases accordingly. When the sum of VIN 120 and the voltage across Cdc 130 is less than the output voltage Vo, the current flowing through the inductor L 121 ramps down and the energy stored in the inductor L 121 decreases accordingly. It is understood that current does not flow through D3 113 as a result of reverse bias within the three-level boost converter 100.

Figure 4:
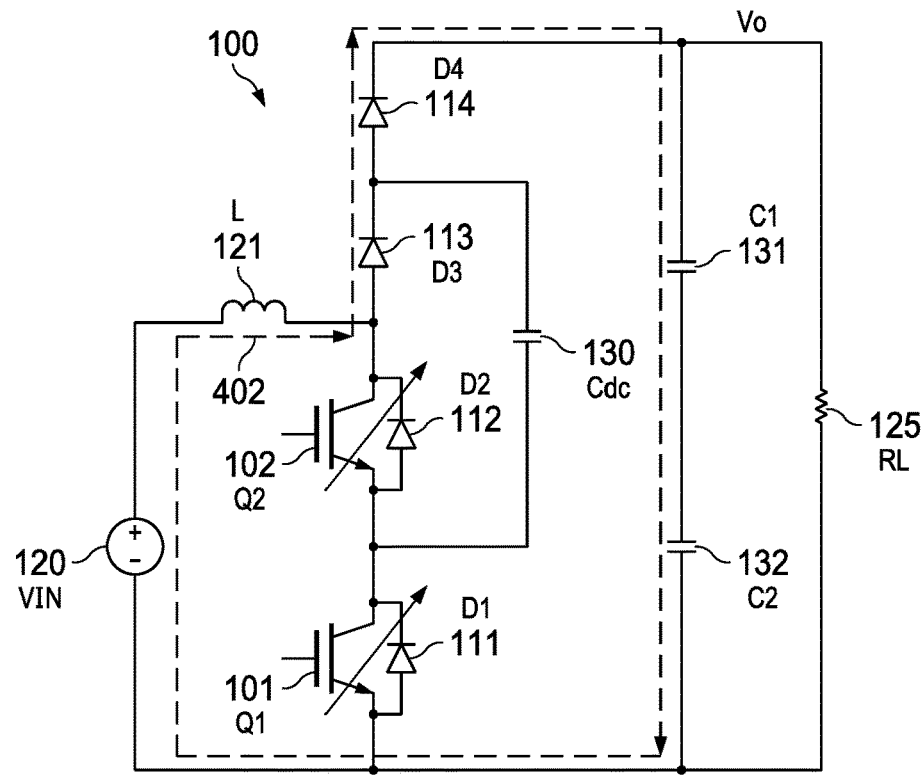
FIG. 4 illustrates a current flow of the three-level boost converter in the third operating mode in accordance with various embodiments of the present disclosure.

FIG. 4 illustrates a current flow of the three-level boost converter in the third operating mode in accordance with various embodiments of the present disclosure. During the third operating mode, both switches Q1 101 and Q2 102 are turned off as indicated by the arrows placed on top of the symbols of Q1 101 and Q2 102. A conductive path is established as indicated by the dashed line 402 shown in FIG. 4. The conductive path is formed by inductor L 121, D3 113, D4 114 and C1 131/C2 132. The current flows from the positive terminal of the input power source VIN 120 to the negative terminal of the input power source VIN 120 through the conductive path shown in FIG. 4. During the third operating mode, the energy stored in the inductor L 121 is discharged to the load RL 125 and the output capacitor C1 131/C2 132. As a result, the current flowing through the inductor L 121 ramps down.

Figure 5:
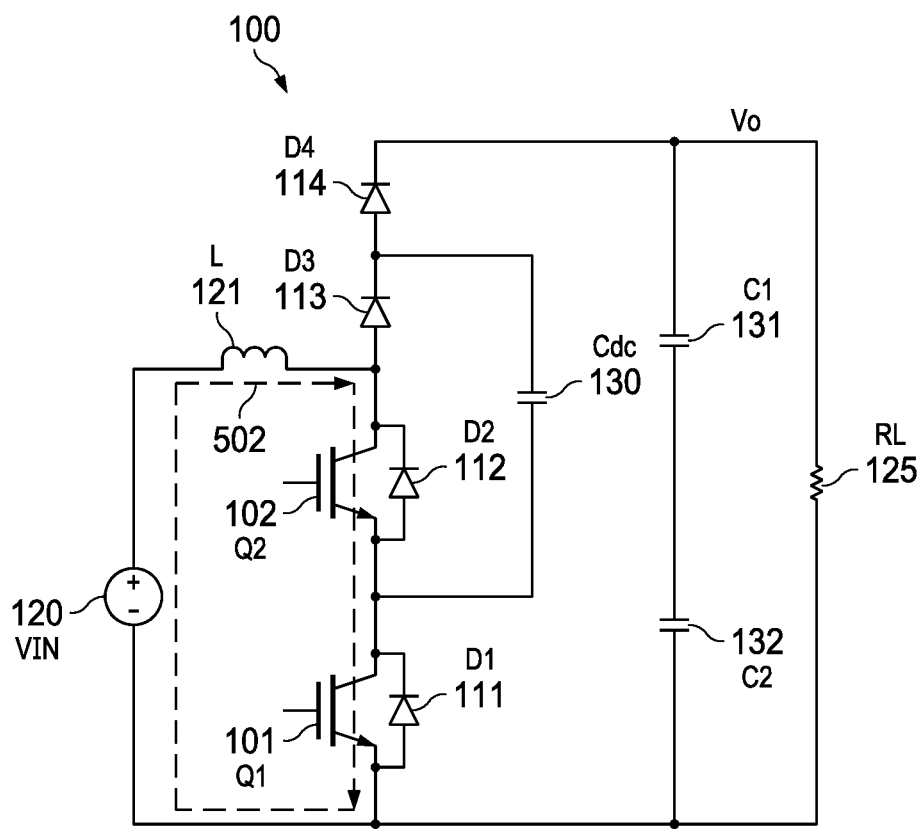
FIG. 5 illustrates a current flow of the three-level boost converter 100 in the fourth operating mode in accordance with various embodiments of the present disclosure.

FIG. 5 illustrates a current flow of the three-level boost converter 100 in the fourth operating mode in accordance with various embodiments of the present disclosure. During the fourth operating mode, both switches Q1 101 and Q2 102 are turned on. A conductive path is established as indicated by the dashed line 502 shown in FIG. 5. The conductive path is formed by inductor L 121, Q2 102 and Q1 101. The current flows from the positive terminal of the input power source VIN 120 to the negative terminal of the input power source VIN 120 through the conductive path shown in FIG. 5. During the fourth operating mode, the current flowing through the inductor L 121 ramps up and the energy stored in the inductor L 121 increases accordingly.

Referring back to FIG. 1, during steady operation, the duty cycle of Q1 101 is equal to the duty cycle of Q2 102. According to the volt-second balance principle, the voltage at the output of the three-level boost converter 100 is given by the following equation:

$$Vo = \frac{Vin}{1-D} \quad (1)$$

where D is the steady state duty cycle of switches Q1 101 and Q2 102, Vo is the output voltage, and VIN 120 is the input voltage.

In some embodiments, the voltage across the capacitor Cdc 130 is adjustable through changing the duty cycles of Q1 101 and Q2 102. More particularly, the voltage across Cdc 130 may increase by operating the converter under a condition satisfying the duty cycle of Q1 101 is greater than the duty cycle of Q2 102. On the other hand, the voltage across Cdc 130 may decrease by operating the converter under a condition satisfying the duty cycle of Q1 101 is less than the duty cycle of Q2 102.

While the voltage across Cdc 130 is adjustable, during steady operation the voltage across Cdc 130 may stay a stable voltage and the duty cycle of Q1 101 is equal to the duty cycle of Q2 102. A controller (not shown) including a feedback loop may be used to monitor the voltage across Cdc 130 so as to maintain the voltage across Cdc 130 stable during steady operation. For example, if the voltage across Cdc 130 is not stable, the controller may slightly adjust the duty cycle of Q1 101 and/or the duty cycle of Q2 102 to achieve a stable voltage across Cdc 130. The feedback loop may comprise a predetermined threshold. The controller may regulate the voltage across Cdc 130 through increasing a duty cycle of the second switch when the voltage across the capacitor Cdc 130 is greater than the predetermined threshold and increasing a duty cycle of the first switch when the predetermined threshold is greater than the voltage across the capacitor Cdc 130.

It should be noted that while the example throughout the description is based upon a non-isolated boost converter, the three-level boost converter 100 shown in FIG. 1 may have many variations, alternatives, and modifications. For example, the three-level boost converter 100 shown in FIG. 1 may include a transformer to achieve an isolated three-level boost converter. The non-isolated topology illustrated herein is limited solely for the purpose of clearly illustrating the aspects of the various embodiments. The present disclosure is not limited to any particular power topology.

As example embodiments, in different voltage applications Q1 101 and D3 114 in the three-level boost converter 100 may be implemented using different ratings. For example, in a 1000 V solar application, Q1 101 and D3 114 can be implemented as semiconductor devices having a voltage rating of 1200 V. Q2 102 and D3 113 can be implemented as semiconductor devices having a voltage rating of 600 V.

In another example, in a 1200 V solar application, the voltage across Cdc 130 is set to 500 V. As a result, the voltage stresses across Q2 102 and D3 113 are about 500 V. Q2 102 and D3 113 can be implemented as semiconductor devices having a voltage rating of 650 V. The voltage stresses across Q1 101 and D3 114 are equal to the difference between the output voltage (1200 V) of the three-level boost converter and the voltage across Cdc 130. In other words, the voltage stresses across Q1 101 and D3 114 are about 700 V. Since the voltage stresses across Q2 102 and D3 113 are low, the switching losses are reduced accordingly.

One advantageous feature of having low voltage rating devices (e.g., Q2 102 and D3 113) is the low voltage stresses on Q2 102 and D3 113 help to reduce conduction losses as well as switching losses. As a result, the efficiency of the three-level boost converter 100 is improved.

Figure 6:
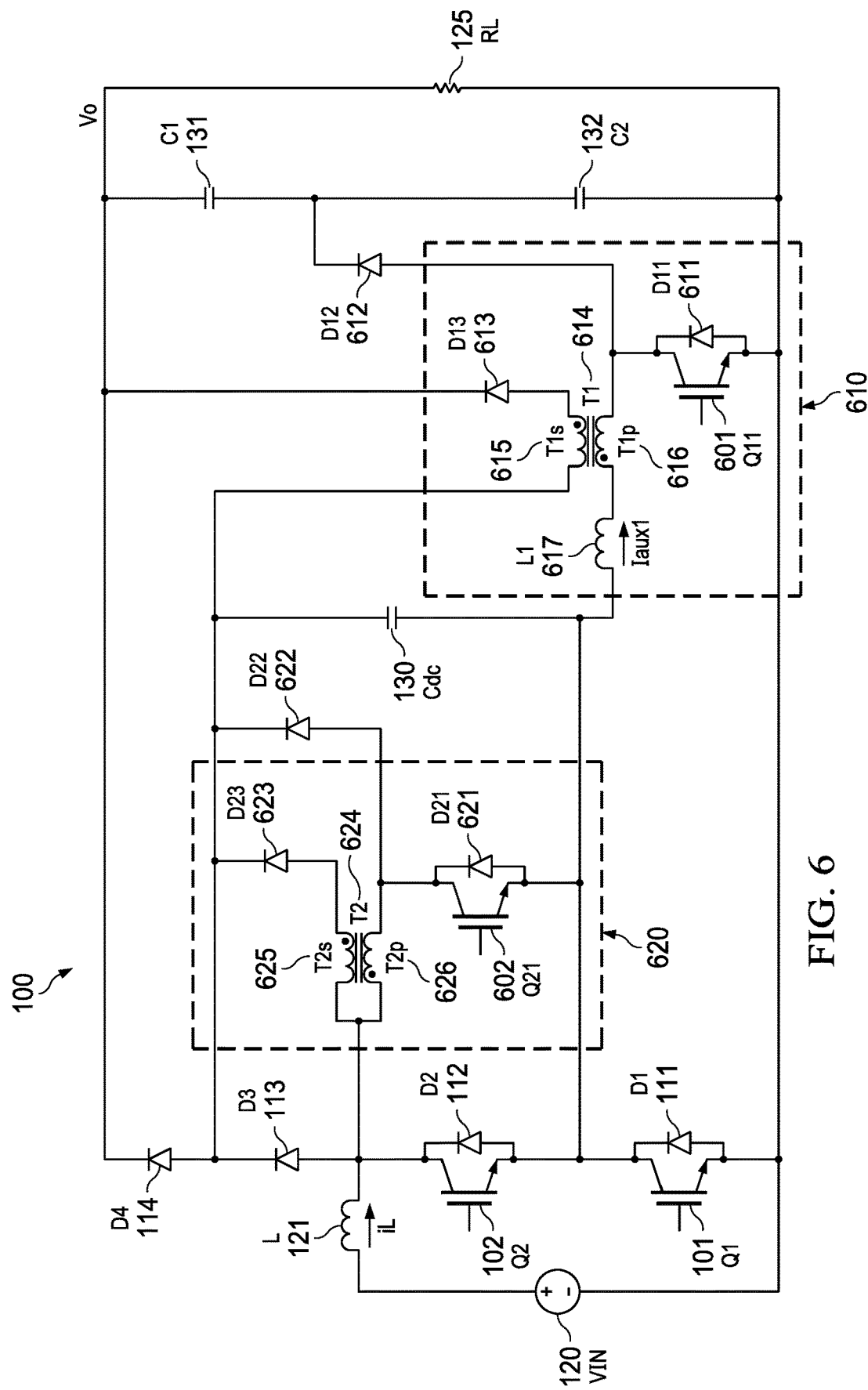
FIG. 6 illustrates a schematic diagram of the three-level boost converter comprising a first soft switching apparatus and a second soft switch apparatus in accordance with various embodiments of the present disclosure.

FIG. 6 illustrates a schematic diagram of the three-level boost converter comprising a first soft switching apparatus and a second soft switch apparatus in accordance with various embodiments of the present disclosure. The three-level boost converter 100 comprises a first soft switching apparatus 610 and a second soft switching apparatus 620. The three-level boost converter 100 further comprises a first voltage clamping diode D12 612 and a second voltage clamping diode D22 622. In some embodiments, by employing the first soft switching apparatus 610 and the second soft switching apparatus 620, the power switches (e.g., Q1 101 and Q2 102) are able to achieve zero voltage switching (ZVS). The power diodes (e.g., D3 113 and D3 114) are able to achieve zero current switching (ZCS). The ZVS operation of the power switches and the ZCS operation of the diodes help to reduce the switching losses of the three-level boost converter 100.

As shown in FIG. 6, the first voltage clamping diode D12 612 is connected between the first soft switching apparatus 610, and a common node of output capacitors C1 131 and C2 132. The first voltage clamping diode D12 612 is employed to clamp the voltage of the first soft switching apparatus 610 to a voltage level approximately equal to one half of the output voltage of the three-level boost converter 100, thereby preventing the first soft switching apparatus 610 from being damaged by excessive voltages.

As shown in FIG. 6, the second voltage clamping diode D22 622 is connected between the second soft switching apparatus 620 and the positive terminal of the flying capacitor Cdc 130. The second voltage clamping diode D22 622 is employed to clamp the voltage of the second soft switching apparatus 620 to a voltage level approximately equal to one half of the output voltage of the three-level boost converter 100, thereby preventing the second soft switching apparatus 620 from being damaged by excessive voltages.

The first soft switching apparatus 610 is coupled to the switch Q1 101. In operation, the first soft switching apparatus 610 is employed to achieve ZVS during the turn-on process of the switch Q1 101. The second soft switching apparatus 620 is coupled to the switch Q2 102. In operation, the second soft switching apparatus 620 is employed to achieve ZVS during the turn-on process of the switch Q2 102.

The first soft switching apparatus 610 comprises a first magnetic device, a first auxiliary switch Q11 601 and a first auxiliary diode D13 613. In some embodiments, the first magnetic device is implemented as a first transformer T1 614 comprising a primary winding T1p 616 and a secondary winding T1s 615 as shown in FIG. 6.

A first terminal of the primary winding T1p 616 is connected to a common node of switches Q1 101 and Q2 102. A second terminal of the primary winding T1p 616 is connected to a common node of the first auxiliary switch Q11 601 and the first voltage clamping diode D12 612. A first terminal of the secondary winding T1s 615 is connected to a common node of diodes D3 113 and D3 114. A second terminal of the secondary winding T1s 615 is connected to an output terminal of the three-level boost converter 100 through the first auxiliary diode D13 613.

The transformer T1's polarities are indicated in FIG. 6 as dots next to the terminals of the primary winding T1p 616 and the secondary winding T1s 615. In particular, the transformer T1 614 has polarity dots at opposing terminals of the primary winding T1p 616 and the secondary winding T1s 615. Such a polarity dot arrangement indicates the currents flowing through two windings are instantaneously out-of-phase with respect to a common ground. In other words, the dot notation indicates the primary side T1p 616 and the secondary side T1s 615 are out of phase by 180 degrees. The operation of a transformer is well known in the art, and hence is not discussed in further detail herein.

The second soft switching apparatus 620 comprises a second magnetic device, a second auxiliary switch Q21 602, a second auxiliary diode D23 623. In some embodiments, the second magnetic device is implemented as a second transformer T2 624 comprising a primary winding T2p 626 and a secondary winding T2s 625 as shown in FIG. 6.

A first terminal of the primary winding T2p 626 is connected to a common node of switch Q2 102 and diode D3 113. A second terminal of the primary winding T2p 626 is connected to a common node of the second auxiliary switch Q21 602 and the second voltage clamping diode D22 622. A first terminal of the secondary winding T2s 625 is connected to the first terminal of the primary winding T2p 626. A second terminal of the secondary winding T2s 625 is connected to a common node of diodes D3 113 and D3 114 through the second auxiliary diode D23 623.

The second transformer T2's polarities are indicated in FIG. 6 as dots next to the terminals of the primary winding T2p 626 and the secondary winding T2s 625. In particular, the transformer T2 624 has polarity dots at opposing terminals of the primary winding T2p 626 and the secondary winding T2s 625. Such a polarity dot arrangement indicates the currents flowing through two windings are instantaneously out-of-phase with respect to a common ground.

In accordance with an embodiment, the auxiliary switches (e.g., switches Q11 601 and Q21 602) may be IGBT devices. Alternatively, the auxiliary switches can be any controllable switches such as MOSFET devices, IGCT devices, GTO devices, SCR devices, JFET devices, MCT devices, SiC devices, GaN devices and the like.

As shown in FIG. 6, auxiliary switches Q11 601 and Q21 602 are implemented as IGBT devices. Separate freewheeling diodes (e.g., D11 611 and D21 621) are required to be connected in parallel with respective switches. In some embodiments, diodes D11 611 and D21 621 are co-packaged with their respective IGBT devices. In alternative embodiments, didoes D11 611 and D21 621 are placed outside their respective IGBT devices.

In operation, the first auxiliary switch Q11 601 is turned on before turning on the switch Q1 101. In response to the turn-on of Q11 601, an auxiliary current Iaux1 flows through the primary winding T1p 616. The input voltage VIN 120 is applied to the leakage inductance L1 617 of the transformer T1 614. As a result of applying the input voltage to the leakage inductance L1 617 of the transformer T1 614, the auxiliary current Iaux1 ramps up. Once the auxiliary current Iaux1 reaches the load current iL, the collector-emitter capacitance of Q1 101 and the leakage inductance L1 617 of the transformer T1 614 form a resonant circuit. The resonant current generated by the resonant circuit discharges the voltage across the collector-emitter capacitance of the switch Q1 101 to a voltage level approximately equal to zero. After a suitable delay, the switch Q1 101 is turned on under a collector-emitter voltage approximately equal to zero. As such, the switch Q1 101 is able to achieve ZVS during a turn-on process.

After the switch Q1 101 has been turned on and before the first auxiliary switch Q11 601 is turned off, the primary winding T1p 616 is shorted by the turned-on switches Q1 101 and Q11 601. At the secondary side of the transformer T1 614, the current flows through the first auxiliary diode T1 613. The turned-on D13 613 pulls the voltage at the second terminal of T1s 615 to a voltage level approximately equal to the output voltage Vo. The voltage across the flying capacitor Cdc 130 is equal to one half of the output voltage Vo. In addition, the switch Q1 101 is turned on. As such, the voltage at the first terminal of T1s 615 is equal to one half of the output voltage Vo. In sum, a negative voltage is across the first terminal and the second terminal of T1s 615. Such a negative voltage is reflected to the primary side T1p 616 and applied to the leakage inductance L1 617 of T1 614. In response to this reflected voltage applied to the leakage inductance L1 617, the auxiliary current Iaux1 reduces in a linear manner After the auxiliary current Iaux1 reaches zero, the first auxiliary switch Q11 601 can be turned off under ZCS.

The operating principle of the second soft switching apparatus 620 is similar to that of the first soft switching apparatus 610, and hence is not discussed again to avoid repetition. It should be noted that the auxiliary switches Q11 601 and Q21 602 are able to achieve ZCS during the turn-on and the turn-off processes of these two switches. Furthermore, the auxiliary diodes D13 613 and D23 623 are able to achieve ZCS during the turn-on and the turn-off processes. The ZCS turn-on and turn-off of the auxiliary components (e.g., Q11 601, Q21 602, D13 613 and D23 623) help to reduce the switching losses of the three-level boost converter 100.

During a startup process of the three-level boost converter 100, the first voltage clamping diode D12 612 may function as a charging diode. More particularly, the output capacitors (e.g., C2 132) may be charged by a current flowing through the first voltage clamping diode D12 612. When the capacitance values of the output capacitors C1 131 and C2 132 are much greater than the capacitance value of the flying capacitor Cdc 130, the voltage balance between the output capacitors C1 131 and C2 132 is determined by the capacitance values of the output capacitors C1 131 and C2 132. When the capacitance values of the output capacitors C1 131 and C2 132 are similar to the capacitance value of the flying capacitor Cdc 130, the voltage balance between the output capacitors C1 131 and C2 132 can be achieved by adjusting the capacitance values of the output capacitors C1 131 and C2 132.

Figure 7:
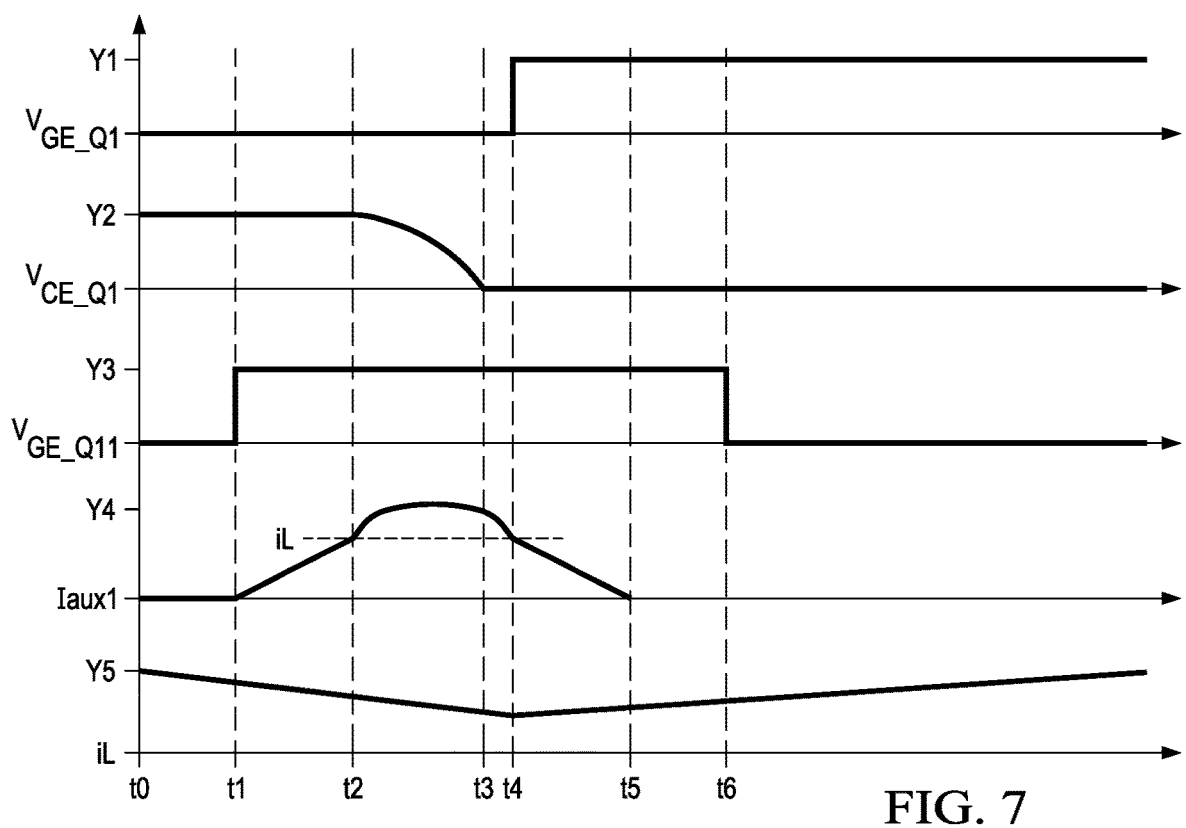
FIG. 7 illustrates a timing diagram of various signals during a ZVS turn-on of the switch Q1 101 in accordance with various embodiments of the present disclosure.

FIG. 7 illustrates a timing diagram of various signals during a ZVS turn-on of the switch Q1 101 in accordance with various embodiments of the present disclosure. The horizontal axis of FIG. 7 represents intervals of time. There may be five vertical axes. The first vertical axis Y1 represents the voltage across the gate and emitter of Q1 101 (gate drive voltage of Q1 101). The second vertical axis Y2 represents the voltage across the collector and emitter of Q1 101. The third vertical axis Y3 represents the voltage across the gate and emitter of Q11 601 (gate drive voltage of Q11 601). The fourth vertical axis Y4 represents the auxiliary current flowing through the primary winding of the transformer T1 614. The fifth vertical axis Y5 represents the current flowing through the inductor L 121.

Referring back to FIG. 6, both the switch Q1 101 and the auxiliary switch Q11 601 are implemented as IGBT devices.

As such, the voltage across the switch Q1 101 is referred to as $V_{CE\_Q1}$. The gate-to-emitter voltage of the switch Q1 101 is referred to as $V_{GE\_Q1}$. The gate-to-emitter voltage of the auxiliary switch Q11 601 is referred to as $V_{GE\_Q11}$. The current flowing through the primary winding of the transformer T1 614 is referred to as Iaux1. The current flowing through the inductor of the output filter is referred to as iL (a.k.a. load current).

During the time interval from t0 to t1, the switch Q1 101 is turned off. The auxiliary switch Q11 601 is turned off. At the time instant t1, the auxiliary switch Q11 601 is turned on in response to a voltage applied to the gate of the auxiliary switch Q11 601. The current flowing into the auxiliary switch Q11 601 may not change instantaneously since the auxiliary switch Q11 601 is connected in series with the primary side T1p 616 of transformer T1 614. As shown in FIG. 7, the current Iaux1 ramps up from zero to a value of about iL at the time instant t2. The ramp-up slope exhibits an approximately linear behavior as shown in FIG. 7. The ramp-up slew rate is determined by the value of the leakage inductance L1 617. The ramp-up slew rate can be adjusted by changing the value of the leakage inductance L1 617.

During the time interval from t2 to t3, the voltage $V_{CE\_Q1}$ across the switch Q1 101 may be discharged by a resonant process generated by the leakage inductance L1 617 of the transformer T1 614 and the collector-to-emitter capacitance of Q1 101. As shown in FIG. 7, the voltage $V_{CE\_Q1}$ across the switch Q1 101 drops to a voltage level approximately equal to zero at the time instant t3. After a suitable delay, at the time instant t4, the switch Q1 101 is turned on. As shown in FIG. 7, the voltage $V_{CE\_Q1}$ across the switch Q1 101 is equal to zero at the time instant t4. The switch Q1 101 is able to achieve ZVS during the turn-on process.

During the time interval from t4 to t5, a negative voltage is applied to the secondary winding of the transformer T1 614. Such a negative voltage is reflected to the primary side of the transformer T1 614. The reflected voltage is applied to the leakage inductance L1 617. In response to the reflected voltage applied to the leakage inductance L1 617, the current flowing through the leakage inductance reduces in a linear manner as shown in FIG. 7. At the time instant t5, the auxiliary current Iaux1 drops to a current level approximately equal to zero. After a suitable delay, at the time instant t6, the auxiliary switch Q11 601 is turned off. As shown in FIG. 7, the current flowing through the auxiliary switch Q11 601 is equal to zero at the time instant t6. The auxiliary switch Q11 601 is able to achieve ZCS during the turn-off process.

One advantageous feature of the first soft switching network is that the switch Q1 101 may achieve a zero voltage turn-on and the auxiliary switches (e.g., Q11 601) are of a zero current turn-off. Such zero voltage switching and zero current switching help to reduce the total power losses of the three-level boost converter 100 shown in FIG. 1.

Referring back to FIG. 6, the semiconductor devices shown in FIG. 6 may comprise parasitic capacitance and/or inductance. For example, the first voltage clamping diode D12 612 may have a parasitic inductance of about 300 nH, which is connected in series with the first voltage clamping diode D12 612. The first auxiliary switch Q11 601 may have a collector-to-emitter capacitance of 100 pF. The leakage inductance of the first transformer T1 614 is about 100 uH. The first switch Q1 101 may have a collector-to-emitter capacitance of 600 pF. The load current is about 19.2 A. The RMS value of the auxiliary current is about 1.6 A. The average value of the auxiliary current is about 0.8 A. Under the operating conditions above, the parasitic inductance of the first voltage clamping diode D12 612 does not have a negative impact on the voltage stresses of the three-level boost converter 100.

Figure 8:
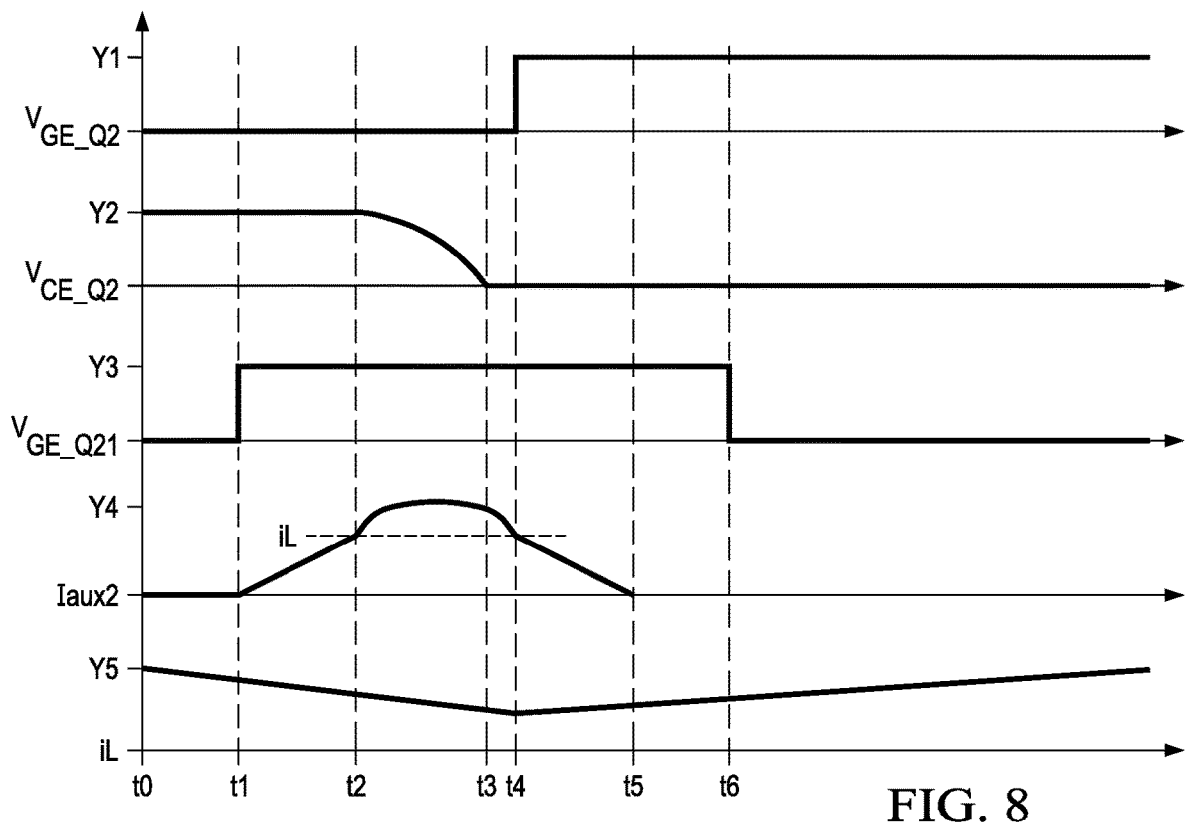
FIG. 8 illustrates a timing diagram of various signals during a ZVS turn-on of the switch Q2 102 in accordance with various embodiments of the present disclosure.

FIG. 8 illustrates a timing diagram of various signals during a ZVS turn-on of the switch Q2 102 in accordance with various embodiments of the present disclosure. The horizontal axis of FIG. 8 represents intervals of time. There may be five vertical axes. The first vertical axis Y1 represents the voltage across the gate and emitter of Q2 102 (gate drive voltage of Q2 102). The second vertical axis Y2 represents the voltage across the collector and emitter of Q2 102. The third vertical axis Y3 represents the voltage across the gate and emitter of Q21 602 (gate drive voltage of Q11 601). The fourth vertical axis Y4 represents the auxiliary current flowing through the primary winding of the transformer T2 624. The fifth vertical axis Y5 represents the current flowing through the inductor L 121.

The turn-on process of the switch Q2 102 and the turn-off process of the auxiliary switch Q21 602 are similar to the turn-on process of the switch Q1 101 and the turn-off process of the auxiliary switch Q11 601 shown in FIG. 8, and hence are not discussed in detail herein.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A power converter comprising:
a first soft switching network coupled to a low-side switch of the power converter, wherein the first soft switching network comprises a first magnetic device and a first auxiliary switch connected in series between a first terminal and a second terminal of the low-side switch, the first soft switching network is configured such that the low-side switch is of zero voltage switching, the first auxiliary switch is of zero current switching, and a primary winding and a secondary winding of the first magnetic device are out of phase; and
a second soft switching network coupled to a high-side switch of the power converter, wherein the second soft switching network comprises a second magnetic device and a second auxiliary switch connected in series between a first terminal and a second terminal of the high-side switch, the second soft switching network is configured such that the high-side switch is of zero voltage switching, the second auxiliary switch is of zero current switching, and at least one terminal of the secondary winding is connected to the second soft switching network directly, wherein the first terminal of the low-side switch is connected to the second terminal of the high-side switch.

2. The power converter of claim 1, wherein the power converter comprises:
a first diode, a second diode, the high-side switch and the low-side switch connected in series between an output terminal of the power converter and ground;
a flying capacitor connected between a common node of the first diode and the second diode, and a common node of the high-side switch and the low-side switch; and
an inductor connected to a common node of the second diode and the high-side switch, and an input terminal of the power converter.

3. The power converter of claim 2, wherein the power converter further comprises:
a first output capacitor and a second output capacitor connected in series between the output terminal of the power converter and ground;
a first voltage clamping diode between the first soft switching network, and a common node of the first output capacitor and the second output capacitor; and
a second voltage clamping diode between the second soft switching network and a positive terminal of the flying capacitor.

4. The power converter of claim 2, wherein:
the first magnetic device is a transformer.

5. The power converter of claim 4, wherein:
the first soft switching network comprises the transformer, the first auxiliary switch and a first auxiliary diode.

6. The power converter of claim 5, wherein:
a first terminal of a primary winding of the transformer is connected to the low-side switch;
a second terminal of the primary winding of the transformer is connected to the first auxiliary switch;
a first terminal of a secondary winding of the transformer is connected to a common node of the first diode and the second diode; and
a second terminal of the secondary winding of the transformer is connected to the output terminal of the power converter through the first auxiliary diode, and wherein the first terminal of the primary winding and the second terminal of the secondary winding share a same polarity.

7. The power converter of claim 5, wherein:
the high-side switch and the low-side switch are IGBT devices.

8. The power converter of claim 5, wherein:
an anode of the first diode is connected to a cathode of the second diode; and
an emitter of the high-side switch is connected to a collector of the low-side switch.

9. The power converter of claim 1, wherein:
the first auxiliary switch is an IGBT.

10. The power converter of claim 1, wherein:
the power converter is a three-level boost converter.

11. An apparatus comprising:
an auxiliary switch configured to be turned on prior to turning on a first power switch of a multi-level boost converter;
a transformer having a primary winding connected between the first power switch and the auxiliary switch; and
an auxiliary diode coupled between a secondary winding of the transformer and an output terminal of the multi-level boost converter, wherein a cathode of the auxiliary diode is connected to the output terminal of the multi-level boost converter, the primary winding and the secondary winding of the transformer are out of phase, the transformer and the auxiliary switch are configured such that the first power switch is of zero voltage switching, the auxiliary switch is of zero current switching, and the multi-level boost converter is a three-level boost converter comprising:
a first diode, a second diode, a second power switch and the first power switch connected in series between the output terminal of the three-level boost converter and ground;
a flying capacitor connected between a common node of the first diode and the second diode, and a common node of the second power switch and the first power switch;
an inductor connected to a common node of the second diode and the second power switch, and an input terminal of the three-level boost converter; and
a first output capacitor and a second output capacitor connected in series between the output terminal of the three-level boost converter and ground.

12. The apparatus of claim 11, wherein:
the primary winding of the transformer is connected between a collector of the first power switch and a collector of the auxiliary switch; and
the secondary winding of the transformer is connected to the output terminal of the multi-level boost converter through the first diode and the auxiliary diode respectively.

13. The apparatus of claim 12, wherein:
a first terminal of the primary winding is connected to the collector of the first power switch;
a second terminal of the primary winding is connected to the collector of the auxiliary switch;
a first terminal of the secondary winding is connected to a common node of the first diode and the second diode; and
a second terminal of the secondary winding is connected to the output terminal of the multi-level boost converter through the auxiliary diode.

14. The apparatus of claim 13, wherein:
the first terminal of the primary winding and the second terminal of the secondary winding share a same polarity.

15. A method comprising:
providing a first soft switching network coupled to a low-side switch of a multi-level boost converter, wherein the first soft switching network comprises a first magnetic device and a first auxiliary switch connected in series between a first terminal and a second terminal of the low-side switch, and wherein a primary winding and a secondary winding of the first magnetic device are out of phase, and wherein at least one terminal of the secondary winding is connected to a common node of two diodes of the multi-level boost converter; prior to a zero voltage turn-on transition of the low-side switch, turning on the first auxiliary switch; and after the zero voltage turn-on transition of the low-side switch, turning off the first auxiliary switch.

16. The method of claim 15, further comprising:
providing a second soft switching network coupled to a high-side switch of the multi-level boost converter, wherein the second soft switching network comprises a second magnetic device and a second auxiliary switch;
prior to a zero voltage turn-on transition of the high-side switch, turning on the second auxiliary switch; and
after the zero voltage turn-on transition of the high-side switch, turning off the second auxiliary switch.

17. The method of claim 16, wherein the multi-level boost converter is a three-level boost converter comprising:
a first diode, a second diode, the high-side switch and the low-side switch connected in series between an output terminal of the three-level boost converter and ground;
a flying capacitor connected between a common node of the first diode and the second diode, and a common node of the high-side switch and the low-side switch;
an inductor connected to a common node of the second diode and the high-side switch, and an input terminal of the three-level boost converter; and
a first output capacitor and a second output capacitor connected in series between the output terminal of the three-level boost converter and ground.

18. The method of claim 17, wherein the first magnetic device is a first transformer, and the first soft switching network further comprises a first auxiliary diode, and wherein:
a primary winding of the first transformer is connected between the low-side switch and the first auxiliary switch; and
the first auxiliary diode is coupled between a secondary winding of the first transformer and the output terminal of the three-level boost converter, and wherein the first transformer and the first auxiliary switch are configured such that the low-side switch is of zero voltage switching, and the first auxiliary switch is of zero current switching.

19. The method of claim 17, wherein the second magnetic device is a second transformer, and the second soft switching network further comprises a second auxiliary diode, and wherein:
a primary winding of the second transformer is connected between the high-side switch and the second auxiliary switch; and
the second auxiliary diode is coupled between a secondary winding of the second transformer and a common node of the first diode and the second diode, and wherein the second transformer and the second auxiliary switch are configured such that the high-side switch is of zero voltage switching, and the second auxiliary switch is of zero current switching.

* * * * *